United States Patent
Gao et al.

(10) Patent No.: US 10,935,786 B2
(45) Date of Patent: *Mar. 2, 2021

(54) METHOD AND SYSTEM FOR NEAR-EYE THREE DIMENSIONAL DISPLAY

(71) Applicant: THE BOARD OF TRUSTEES OF THE UNIVERSITY OF ILLINOIS, Urbana, IL (US)

(72) Inventors: Liang Gao, Santa Clara, CA (US); Wei Cui, Urbana, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 27 days.

This patent is subject to a terminal disclaimer.

(21) Appl. No.: 16/251,283

(22) Filed: Jan. 18, 2019

(65) Prior Publication Data

US 2019/0171007 A1    Jun. 6, 2019

Related U.S. Application Data

(63) Continuation of application No. 15/651,487, filed on Jul. 17, 2017, now Pat. No. 10,215,983.

(Continued)

(51) Int. Cl.
*G02B 27/14* (2006.01)
*G02B 27/01* (2006.01)
(Continued)

(52) U.S. Cl.
CPC .............. *G02B 27/01* (2013.01); *G02B 5/30* (2013.01); *G02B 6/00* (2013.01); *G02B 6/0011* (2013.01);
(Continued)

(58) Field of Classification Search
CPC .... G02B 2027/0174; G02B 2027/0178; G02B 27/01; G02B 27/0101; G02B 27/0103; G02B 27/017; G02B 27/0172
(Continued)

(56) References Cited

U.S. PATENT DOCUMENTS 5,539,578 A    7/1996    Togino et al.
8,646,917 B2    2/2014    Reichow et al.
(Continued)

FOREIGN PATENT DOCUMENTS

WO    2003079272       9/2003
WO    2015134740 A1    9/2015

OTHER PUBLICATIONS

"Oculus Research to Present Focal Surface Display Discovery at Siggraph", May 15, 2017, 5 pages.
(Continued)

*Primary Examiner* — William Choi
(74) *Attorney, Agent, or Firm* — Guntin & Gust, PLC; Matthew Tropper

(57) ABSTRACT

A 3D near eye display device is provided, the display device comprising a display screen for displaying more than one 2D images, at least one focusing element for collimating the images to sub-images, a spatial multiplexing unit capable of remapping the sub-images to different depths while forcing their centers to align to form remapped sub-images, and an eye piece. The device and methods allow for a high quality, compact 3D display system that can be wearable and overcomes the vergence-accommodation conflict that leads to visual discomfort and fatigue caused by traditional 3D near eye display devices.

20 Claims, 10 Drawing Sheets

Related U.S. Application Data

(60) Provisional application No. 62/363,886, filed on Jul. 19, 2016.

(51) Int. Cl.
  F21V 8/00 (2006.01)
  G02B 5/30 (2006.01)
  G02B 6/00 (2006.01)
  H04N 13/344 (2018.01)
  G02B 30/25 (2020.01)

(52) U.S. Cl.
  CPC ....... G02B 6/0035 (2013.01); G02B 27/0172 (2013.01); G02B 30/25 (2020.01); H04N 13/344 (2018.05); *G02B 2027/0127* (2013.01); *G02B 2027/0134* (2013.01)

(58) Field of Classification Search
  USPC .......................................... 359/630; 345/7–9
  See application file for complete search history.

(56) References Cited

U.S. PATENT DOCUMENTS

| | | | |
|---|---|---|---|
| D701,206 S | 3/2014 | Luckey et al. | |
| 10,215,983 B2* | 2/2019 | Gao | G02B 6/00 |
| 2011/0001804 A1 | 1/2011 | Urey et al. | |
| 2014/0168783 A1 | 6/2014 | Luebke et al. | |
| 2014/0292620 A1 | 10/2014 | Lapstun et al. | |
| 2014/0347361 A1 | 11/2014 | Alpaslan et al. | |
| 2018/0024355 A1 | 1/2018 | Gao et al. | |

OTHER PUBLICATIONS

Bianchi, et al., Computer Physics Communications vol. 181, Apr. 24, 2010, 5 pages.
Blanchard, et al., "Simultaneous multiplane imaging with a distorted diffraction grating", Applied Optics, Oct. 10, 1999, 8 pages.
Dalgarno, et al., "Multiplane imaging and three dimensional nanoscale particle tracking in biological microscopy", Optics Express, Jan. 6, 2010, 8 pages.
Geng, Jason, "Three-dimensional display technologies", IEEE Intelligent Transportation Systems Society, Nov. 22, 2013, 80 pages.
Grzegorzek, et al., "Time-of-Flight and Depth Imaging Sensors, Algorithms, and Applications", Aug. 2013.
Hoffman, et al., "Vergence-accommodation conflicts hinder visual performance and cause visual fatigue", Journal of Vision, Mar. 28, 2008, 30 pages.
Hu, et al., "Design and Assessment of a Depth-Fused Multi-Focal-Plane Display Prototype", Journal of Display Technology, Jan. 15, 2014, 9 pages.
Hu, et al., "High-resolution optical see-through multi-focalplane head-mounted display using freeform optics", Optics Express, May 30, 2014, 8 pages.
Hua, et al., "A 3D integral imaging optical see-through head-mounted display", Optics Express, May 28, 2014, 8 pages.
Johannsen, et al., "On the Calibration of Focused Plenoptic Cameras", Time-of-Flight and Depth Imaging : Sensors, Algorithms, and Applications, 2013, 16 pages.
Lanman, et al., "Near-Eye Light Field Displays", 2013, 1 page.
Leonardo, et al., "Computer generation of optimal holograms for optical trap arrays", Optics Express, Feb. 19, 2007, 10 pages.
Llull, et al., "Design and optimization of a near-eye multifocal display system for augmented reality", Imaging and Applied Optics, 2015, 3 pages.
Luo, et al., "Simulations and experiments of aperiodic and multiplexed gratings in vol. holographic imaging systems", Optical Society of America, Aug. 26, 2010, 13 pages.
Matsuda, et al., "Focal Surface Displays", ACM Transactions on Graphics, Jul. 2017, 14 pages.
Ravikumar, "Creating effective focus cues in multi-plane 3D displays", Optics Express, Oct. 6, 2011, 13 pages.
Sinha, et al., "Imaging using volume holograms", Society of Photo-Optical Instrumentation Engineers, Feb. 27, 2004, 14.

* cited by examiner

100

200

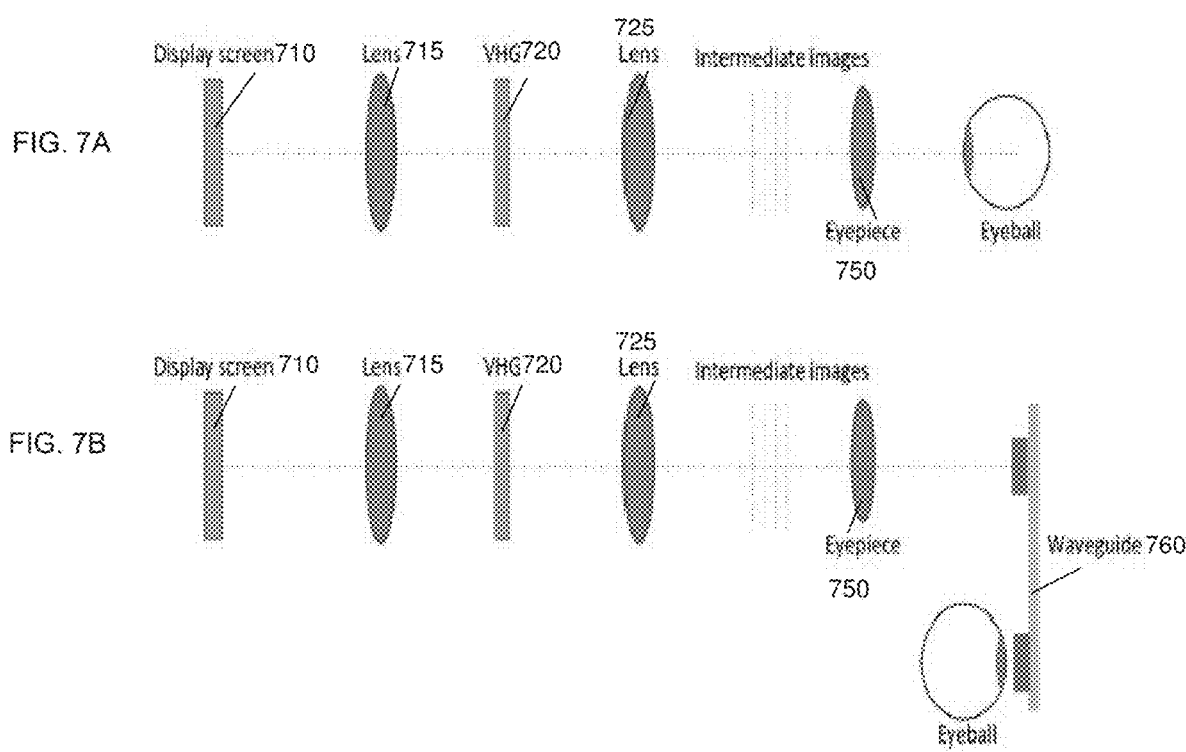

METHOD AND SYSTEM FOR NEAR-EYE THREE DIMENSIONAL DISPLAY

CROSS-REFERENCE TO RELATED APPLICATION(S)

This application is a continuation of U.S. patent application Ser. No. 15/651,487, filed Jul. 17, 2017, which claims the benefit of U.S. Provisional Application No. 62/363,886, filed Jul. 19, 2016. All sections of the aforementioned application(s) and patent(s) are incorporated herein by reference in their entirety.

FIELD OF THE DISCLOSURE

The subject disclosure relates to a method and system for near-eye three dimensional display.

BACKGROUND

Near-eye three-dimensional (3D) displays have seen rapid growth and held great promise in a variety of applications, such as gaming, film viewing, and professional scene simulations. Currently, most near-eye three-dimensional displays are based on computer stereoscopy, which presents two images with parallax in front of the viewer's eyes. Stimulated by binocular disparity cues, the viewer's brain then creates an impression of the three-dimensional structure of the portrayed scene. However, these stereoscopic displays suffer from a major drawback of a vergence-accommodation conflict, which reduces the viewer's ability to fuse the binocular stimuli while causing discomfort and fatigue. The vergence-accommodation conflict can be attributed to the images being displayed on one surface and the focus cues specifying the depth of the display screen (i.e., accommodation distance) rather than the depths of the depicted scenes (i.e., vergence distance). This is opposite to the viewer's perception in the real world where these two distances are always the same. To alleviate this problem, one must present correct focus cues that are consistent with binocular stereopsis.

Currently, only a few approaches can attempt to provide correct or nearly correct focus cues for the depicted scene, such as light field near-eye displays and multiplane near-eye displays. The light field display employs a lenslet array to project multi-view images simultaneously onto the viewer's retina, thereby yielding a continuous three-dimensional sensation. Despite a compact form factor, the spatial resolution is low (~100×100 pixels), restricted by the number of pixels that can fit into the imaging area of a lenslet.

By contrast, the multiplane display projects two-dimensional images onto a variety of depth planes through either temporal multiplexing or spatial multiplexing. By synchronizing a fast display with a deformable mirror or a focal sweeping lens, the temporal-multiplexing-based methods project depth images in sequence. However, to render continuous motion, the device must display all depth images within the flicker fusion time ($1/60$ s), thus introducing a severe trade-off between the image dynamic range and the number of depth planes. For example, given 23 k pattern refresh rate at digital micromirror device and six displayed image planes, the dynamic range of each image for this process can be approximately only 6 bits (64 grey levels). Alternatively, the spatial-multiplexing-based methods deploy multiple screens at various distances from the viewer, followed by optically combining their images using a beam splitter. Because of the usage of multiple screens, such devices are normally bulky, making them unsuitable for wearable devices.

BRIEF DESCRIPTION OF THE DRAWINGS

The features, objects and advantages other than those set forth above will become more readily apparent when consideration is given to the detailed description below. Such detailed description makes reference to the following drawings, wherein:

FIG. 7a is a block diagram illustrating an example embodiment of an optical mapping near-eye three dimensional display utilizing a volume holography grating for virtual reality in accordance with various aspects described herein.

FIG. 7b is a block diagram illustrating an example embodiment of an optical mapping near-eye three dimensional display utilizing a volume holography grating for augmented reality in accordance with various aspects described herein.

Figure 1:
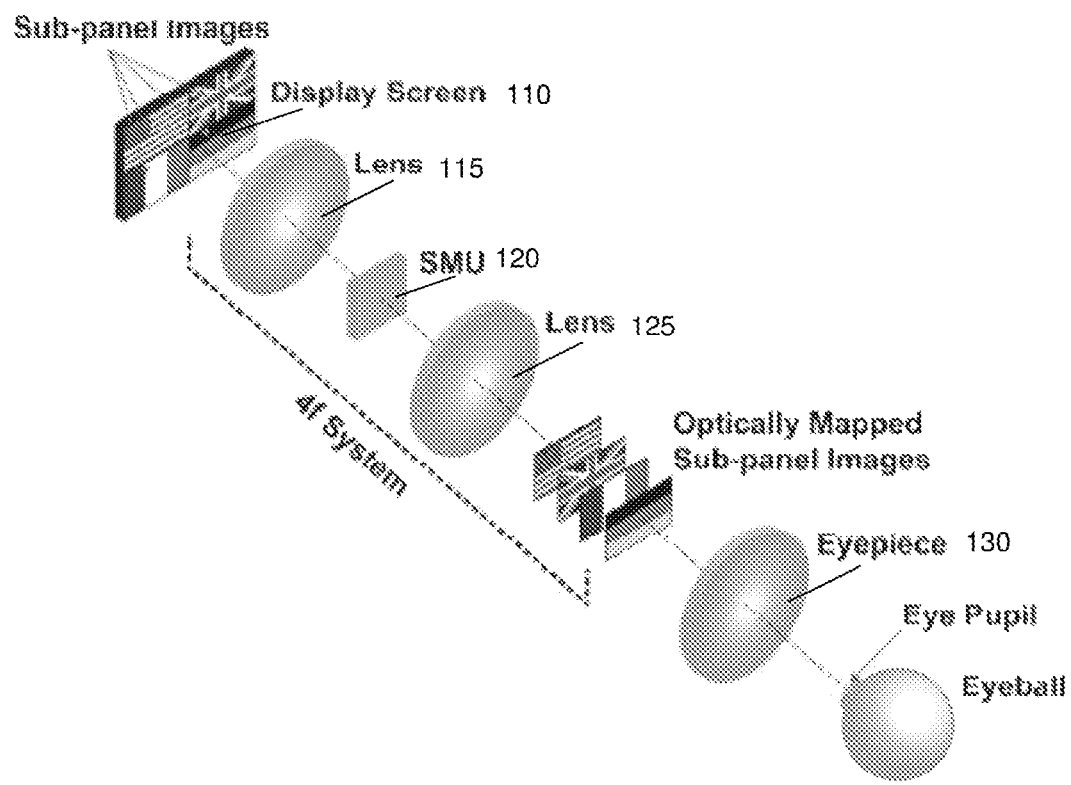
FIG. 1 is a block diagram illustrating an example embodiment of an operating principle of an optical mapping near-eye three dimensional display utilizing a spatial multiplexing unit in accordance with various aspects described herein.

While the present disclosure is susceptible to various modifications and alternative forms, exemplary embodiments thereof are shown by way of example in the drawings and are herein described in detail. It should be understood, however, that the description of exemplary embodiments is not intended to limit the disclosure to the particular forms disclosed, but on the contrary, the intention is to cover all modifications, equivalents and alternatives falling within the spirit and scope of the disclosure as defined by the embodiments above and the claims below. Reference should therefore be made to the embodiments above and claims below for interpreting the scope of the disclosure.

DETAILED DESCRIPTION

The devices and methods now will be described more fully hereinafter with reference to the accompanying drawings, in which some, but not all embodiments of the disclosure are shown. Indeed, the exemplary embodiments may be embodied in many different forms and should not be construed as limited to the embodiments set forth herein; rather, these embodiments are provided so that this disclosure will satisfy applicable legal requirements.

Likewise, many modifications and other embodiments of the devices and methods described herein will come to mind to one of skill in the art to which the disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

Unless defined otherwise, all technical and scientific terms used herein have the same meaning as commonly understood by one of skill in the art to which the disclosure pertains. Although any methods and materials similar to or equivalent to those described herein can be used in the practice or testing of the present disclosure, the preferred methods and materials are described herein.

One or more of the exemplary embodiments provide a 3D near-eye display device and methods that can be used in virtual-reality and/or augmented-reality wearable devices, such as smart glasses or helmets. By remapping different portions of a 2D image to different depths in 3D space, the proposed method solves a vergence-accommodation conflict, which can be the main cause for visual discomfort and fatigue. In addition, the resultant system is compact and light-weight, facilitating its integration with wearable devices. In one or more embodiments, near-eye 3D displays can be applied to scientific and/or medical visualization. In one or more embodiments, to alleviate the problem of the vergence-accommodation conflict, a device can present correct focus cues that are consistent with binocular disparity cues.

In one or more embodiments, an optical mapping near-eye (OMNI) three-dimensional display method, such as for wearable devices, is provided. For example, by dividing a display screen into different sub-panels and optically mapping them to various depths, a multiplane volumetric image can be created or otherwise generated with correct focus cues for depth perception. The resultant system can drive the eye's accommodation to the distance that is consistent with binocular stereopsis, thereby reducing or eliminating the vergence-accommodation conflict, which can be the primary cause for eye fatigue and discomfort. Compared with conventional methods, the OMNI display offers prominent advantages in adaptability, image dynamic range, and refresh rate.

In one or more embodiments, a spatial-multiplexing-based multi-plane display device is described. However, rather than using multiple electronic screens, one or more of the exemplary embodiments can employ only one screen, maintaining a compact form factor similar to temporal-multiplexing-based methods. In one or more embodiments, the system maps different portions of a display screen to different depths while forcing their centers aligned. The multiplane images can then be reimaged onto a viewer's retina through an eyepiece and a focusing element (e.g., crystalline lens). Capable of providing the correct focus cues, this approach can solve the aforementioned vergence-accommodation conflict seen in conventional computer stereoscopic displays. Furthermore, unlike the temporal-multiplexing-based methods, the image dynamic range and the number of displayed planes can be decoupled in one or more of the exemplary embodiments. Therefore, the resultant system can form 3D images with a high dynamic range limited by only the electronic screen itself.

In one or more embodiments, a 3D near eye display device includes a display screen that displays a plurality of two dimensional (2D) images, a focusing element that collimates the plurality of 2D images, a spatial multiplexing unit (SMU) that remaps the plurality of 2D images to different depths while forcing centers of the plurality of 2D images to align, and an eye piece.

In one or more embodiments, a method can include displaying, by a display screen of a wearable device, a plurality of 2D images. The method can include collimating, by a focusing element of the wearable device, the plurality of 2D images. The method can include modifying, by a SMU of the wearable device, a phase of incident light by adding quadratic and linear phase terms to an incident wave front of the 2D images resulting in multiplane images. The method can include reimaging, by an eye piece of the wearable device, the multiplane images onto a viewer's retina.

In one or more embodiments, a 3D near eye display device includes a display screen comprising first and second panels that display 2D images. The 3D near eye display device includes a beam splitter having first and second surfaces that align with the first and second panels, respectively, where the beam splitter combines light emanating from the first and second panels of the display screen. The 3D near eye display device includes an actuator that laterally slides the beam splitter in a direction along the first panel of the display screen to adjust a gap between the second panel and the second surface of the beam splitter resulting in an optical path difference. The 3D near eye display device includes a focusing element that projects the 2D images to different depth planes and includes an eye piece.

In one aspect, one or more of the exemplary embodiments provide a 3D near-eye display device comprising a display screen, at least one focusing element, a SMU, and an eye piece. In one embodiment, the display screen is selected from light emitting diode (LED), liquid crystal display (LCD), organic light emitting diode (OLED) and flexible OLED. In another embodiment, the display screen may not be provided by the device, but provided by a secondary source (e.g. smart phone, tablet). For example, the 3D near eye device may be designed so as to lack a display screen, but have the ability to attach a portable device such as a smart phone or a tablet to the device, which acts as the display screen to display the 2D images. In this embodiment, the device will provide a means of securely attached a secondary screen such as a cell phone to the device. The display screen can be any screen capable of delivering an image, for example, it could be a mirror reflecting an image or a rasterized image where a beam draws an image like the older CRT TVs. In addition, the display screen may also be multiple abutting displays.

In another embodiment, the device is wearable, e.g. in the form of goggles, glasses, or a helmet. In another embodiment, the 2D images comprise at least two 2D images, with the images displayed at a variety of depths. The number of images does not need to be limited. In theory, the more images the better. However, there is a trade-off between each images pixel resolution and the total number of images. In one embodiment, the display screen displays between 2 to 6 images. In a further embodiment, the device further comprises computer hardware running software to execute algorithms to assist in reimaging and modifying the incident light by the SMU and for remapping the images. In one embodiment, a depth-weighted blending algorithm can be used to determine the content of sub-images at the display screen.

In one embodiment, the SMU can be a special light modulator (SLM), and can include, but is not limited to, liquid-crystal-on-silicon (LCOSD) special light modulator, a volume holography grating (VHG) and a distorted phase grating. The SMU can be used to map sub-images to different depths. Mapping sub-images to different depths while forcing their centers aligned faces two challenges: lateral remapping and defocus compensation. To achieve these two goals, the SMU can function as multifocal off-axis Fresnel lenses, adding both the linear and quadratic phase terms to the incident wavefront.

In some embodiments, the device comprises more than one focusing element. The number of focusing elements used can vary depending on, for example, what type of SMU is utilized. When the SMU is LCOS SLM (e.g., FIG. 6A) or VHG (e.g., FIG. 7a), the device may comprise a second and/or a third focusing element. In some embodiments, a first focusing element can be positioned between the display screen having more than one image of varying depth and the SMU, and this focusing element can function to collimate the images from the display screen into the SMU, with their centers aligning. A second focusing element may be employed to take the remapped images from the SMU and help focus them into sub-images that are viewable by the pupil of a viewer either by an eyepiece (for virtual reality), or an eyepiece attached to a view combiner (for augmented reality). In another embodiment, a third focusing element may be used to help focus the image for better viewing through the eyepiece. Alternatively if the SMU is a distorted phase grating (e.g., FIG. 9a) or makes use of a folded flexible display screen and a beam splitter (e.g., FIG. 10a), only one focusing element may be used. For a distorted phase grating, the focusing element can be positioned a distance from the display screen, with the distorted phase grating located immediately adjacent to the focusing element. The focusing element and distorted phase grating projects intermediate images that can be viewed by the eyepiece, or by the eyepiece attached to a view combiner.

For a flexible display screen configuration, the display screen can be bent at about a 90° angle with at least one image on each surface (FIG. 10a), and a beam splitter located close to the folded display screen. A focusing element can be positioned between the beam splitter and the eyepiece (with or without a waveguide). The view combiner can include, but is not limited to, a beam splitter, a prism, or a waveguide. "Focusing element" can include any materials or arrangement of materials, which can be used to focus an optical image. Examples of focusing elements include, but are not limited to, lenses, crystalline lenses, converging and diverging prisms, a magnetic field used for focusing electron beams, a focusing mirror alone or in combination with focusing lenses, and the like. In one embodiment, the focusing element is a lens. In another embodiment, the lens is a crystalline lens. Crystalline lenses are the most common focusing element, however, it should be noted that the exemplary embodiments are not limited to crystalline lenses and any element or means that can focus an image can be used in the present disclosure.

The operating principle for an exemplary OMNI 3D display 100 is illustrated in FIG. 1. A high-resolution two-dimensional image can be displayed at an electronic screen 110. The image can consist of several sub-panels, each targeting to be displayed at a designated depth. In one embodiment, an optical relay (e.g., a 4f optical relay) can be utilized which has a spatial multiplexing unit (SMU) 120 located at the Fourier plane. The SMU 120 can function as a multifocal off-axis Fresnel lens, adding both quadratic and linear phase terms to the incident wavefront. The quadratic phase terms can axially shift sub-panel images to the designated depths, while the linear phase terms can laterally shift the centers of sub-panel images to the optical axis. As a result, the sub-panel images can be mapped to different axial locations and laterally aligned at the output end. Finally, the light emanated from these intermediate depth images can be collected by an eyepiece 130 and enters the eye pupil. Depending on their relative axial positions, the viewer perceives these multi-depth images at a distance from a near plane to infinity. Unlike previous spatial multiplexing approaches, OMNI 3D display 100 can utilize a single display screen at the input, thereby maintaining a compact form factor.

In one or more embodiments, the electronic screen 110 can be a liquid crystal display, light emitting diode, or organic light emitting diode. In one or more embodiments, the light emanated from the electronic screen 110 can be collimated by a lens 115. In one or more embodiments, the SMU 120 can be a transmissive or reflective SMU. In one or more embodiments, the SMU 120 can be placed at the exit pupil of the lens 115, modifying the phase of incident light. In one or more embodiments, the transmitted or reflected light can be collected by a second lens 125, forming multiple images at different depths. In one or more embodiments, the resultant multi-plane images when reimaged have a back focal plane that co-locates with the viewer's eye pupil. In one or more embodiments, to create a 3D scene with continuous depth perception, a depth-weighted blending algorithm can be employed to determine the content of sub-images at the display screen.

Figure 2:
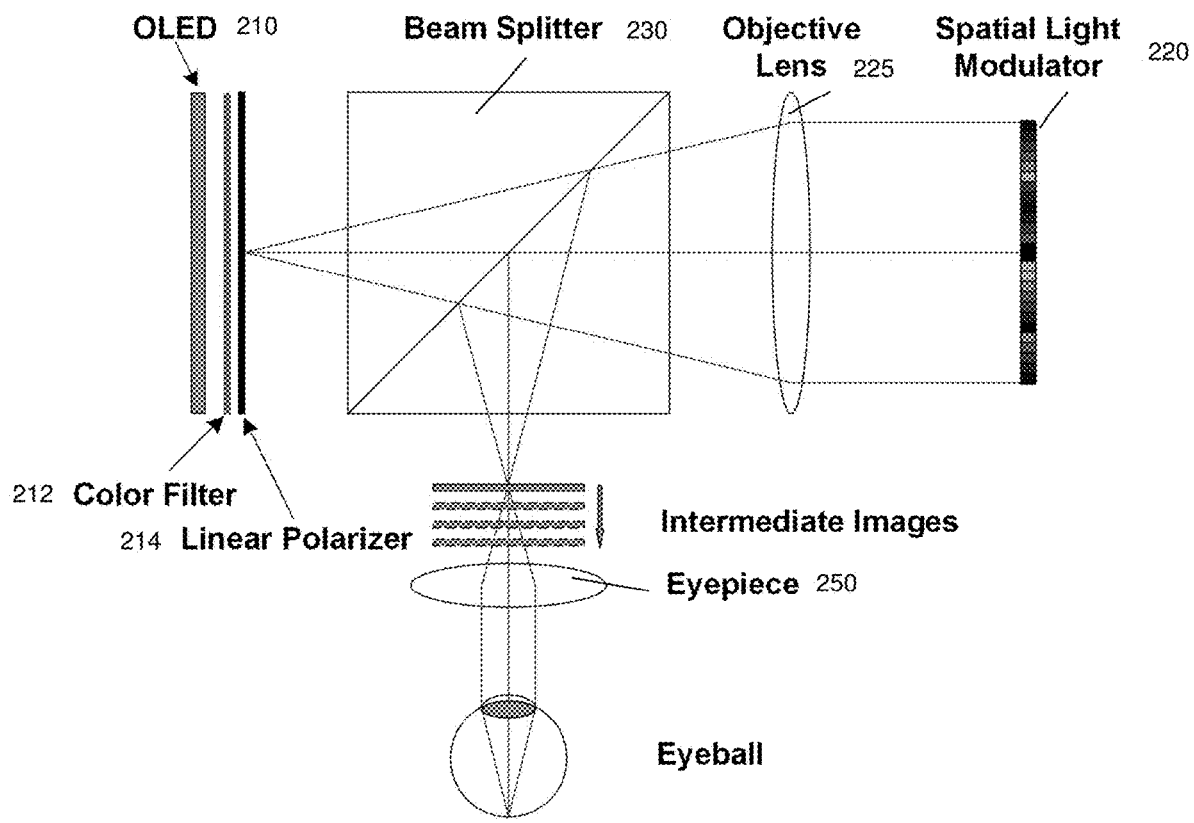
FIG. 2 is a block diagram illustrating an example embodiment of an optical mapping near-eye three dimensional display utilizing a spatial light modulator and an organic light emitting diode in accordance with various aspects described herein.

Referring to FIG. 2, the OMNI 3D display 200 can include a reflective SMU that employs a liquid-crystal-on-silicon spatial light modulator 220. In one embodiment, light emanated from a monochromatic organic light emitting diode screen 210 (e.g., MDP02BCYM, 2000×2000 pixels, Micro oled) can be filtered in color (e.g., central wavelength, 550 nm; bandwidth, 10 nm) and/or polarization (e.g., p light), such as through use of color filter 212 and linear polarizer 214, respectively. The filtered light can pass through a beam splitter 230 (e.g., a 50:50 beam splitter). The light can then be collimated by an infinity-corrected microscope objective (e.g., 2×M Plan APO, Edmund Optics). The LCOS-SLM 220 can be positioned at the exit pupil of the objective lens 225 to modulate a phase of the incident light. The reflected light can be collected by the same objective lens 225, reflected at the beam splitter 230, and can form intermediate images at a variety of depths in front of an eyepiece 250 (e.g., focal length, 25 mm; LB1761-A, Thorlabs).

To map the sub-panel image i to the designated location, a phase pattern is displayed on the LCOS-SLM in the form:

$$\varphi_i(x, y) = \frac{\pi(x^2 + y^2)}{\lambda f_i} + \frac{2\pi}{\lambda}\left[\sin\left(\frac{l_{x_i}}{f_o}\right)x + \sin\left(\frac{l_{y_i}}{f_o}\right)y\right],$$

where $\lambda$ is the light wavelength, $f_i$ is the effective focal length of the LCOS-SLM, $f_e$ is the focal length of the objective lens in FIG. 2, $l_{x_i}$ and $l_{y_i}$ are center coordinates of sub-panel image i at the OLED. Because each sub-panel image requires a different set of $f_i$, $l_{x_i}$, and $l_{y_i}$, the ideal phase pattern that enables simultaneous mapping of all sub-panel images is $\Sigma_i \varphi_i$. However, in practice, since the displayed phase must be wrapped within $2\pi$ and discretized into 8-bit levels, the simple additive phase pattern is inapplicable.

To generate a phase pattern that functions similarly to $\Sigma_i \varphi_i$, an optimization algorithm, Weighted Gerchberg-Saxton (WGS), can be applied. WGS starts with an initial phase estimate $\varphi_{est}(x,y)$, followed by iteratively updating this estimate to maximize a merit function T, which is defined as:

$$T = \sum_{i=1}^{A}\left\{\frac{1}{B}\sum_x\sum_y e^{j[\varphi_{est}(x,y) - \varphi_i(x,y)]}\right\}.$$

Here x, y are the discretized Cartesian coordinates, A is the total number of sub-panel images, B is the total number of the LCOS-SLM's pixels, and j is the imaginary number. The optimization process maximizes the overall likelihood between $\varphi_{est}$ and $\varphi_i$ for all sub-panel images.

In one or more embodiments to create a three-dimensional scene with continuous depth perception, a linear depth-weighted blending algorithm can be applied to create the contents of sub-panel images. The image intensity at each depth plane can be rendered proportional to the dioptric distance of the point from that plane to the viewer along a line of sight. The sum of the image intensities can be maintained as a constant at all depth planes.

Compared with existing near-eye three-dimensional displays, the OMNI display 200 offers advantages in adaptability, image dynamic range, and/or refresh rate. In one embodiment, because the sub-panel images occupy the same display screen at the input end, the product of a depth plane's lateral resolution (L×M pixels) and the number of depth planes (N) should not be greater than the total number of pixels (P) at the display screen, i.e., L×M×N≤P. Taking this constraint into consideration, the system can be configured working in two modes which selectively bias the lateral resolution and the depth plane spacing, respectively, by alternating the phase patterns on the LCOS-SLM. For the given high-resolution OLED (P=4 megapixels) and a depth range of 0-3D (diopter), two typical display settings are summarized in
Table 1:

TABLE 1

System parameters of an OMNI display.

| | Lateral resolution (pixels) | Depth plane spacing (diopter) |
|---|---|---|
| High lateral resolution mode | 1000 × 1000 | 1.0 |
| Dense depth sampling mode | 500 × 500 | 0.2 |

The scalability of display parameters thus grants more freedom to adapt the OMNI display 200 to the depicted scene framewise. Furthermore, unlike the temporal-multiplexing-based multiplane display, herein the image refresh rate and dynamic range are decoupled from the number of depth planes and thereby limited by only the display screen itself. Using the given OLED, a high dynamic range (12 bits) three-dimensional video can be displayed in real time (30 Hz).

Figure 3:
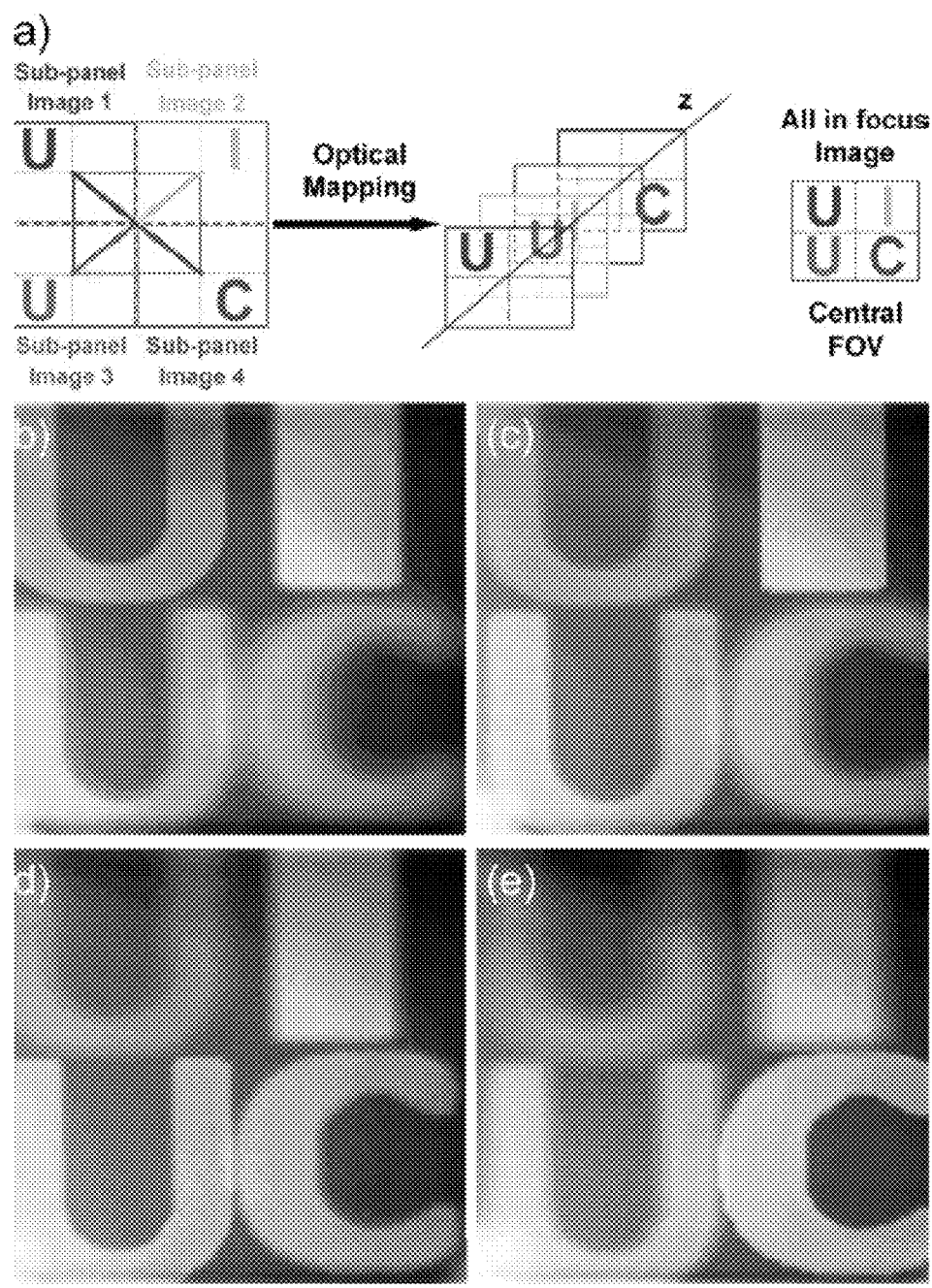
FIG. 3 is an illustration of visualization of intermediate depth plane images including: (a) Optical mapping of four letters "U," "I," "U," "C" from four sub-panels to the central field of view; and (b-e) Intermediate depth images captured at 0D, 1D, 2D, and 3D, respectively.

Referring to FIG. 3, to visualize the intermediate depth images in the OMNI display 200, a mapping experiment was performed. At the input end, four letters "U", "I", "U", "C" are displayed in the four sub-panels of the OLED (FIG. 3(a)) and the OMNI display 200 was set working in the high lateral resolution mode (
Table 1).
A camera was placed at the focus of the eyepiece and translated towards the eyepiece, to capture images at four nominal depth planes (0D, 1D, 2D, and 3D). The remapped letter images at these four depths are shown in FIGS. 3(b)-(e), respectively. The letters appear sharp at their designated depths while blurred elsewhere.

Figure 4:
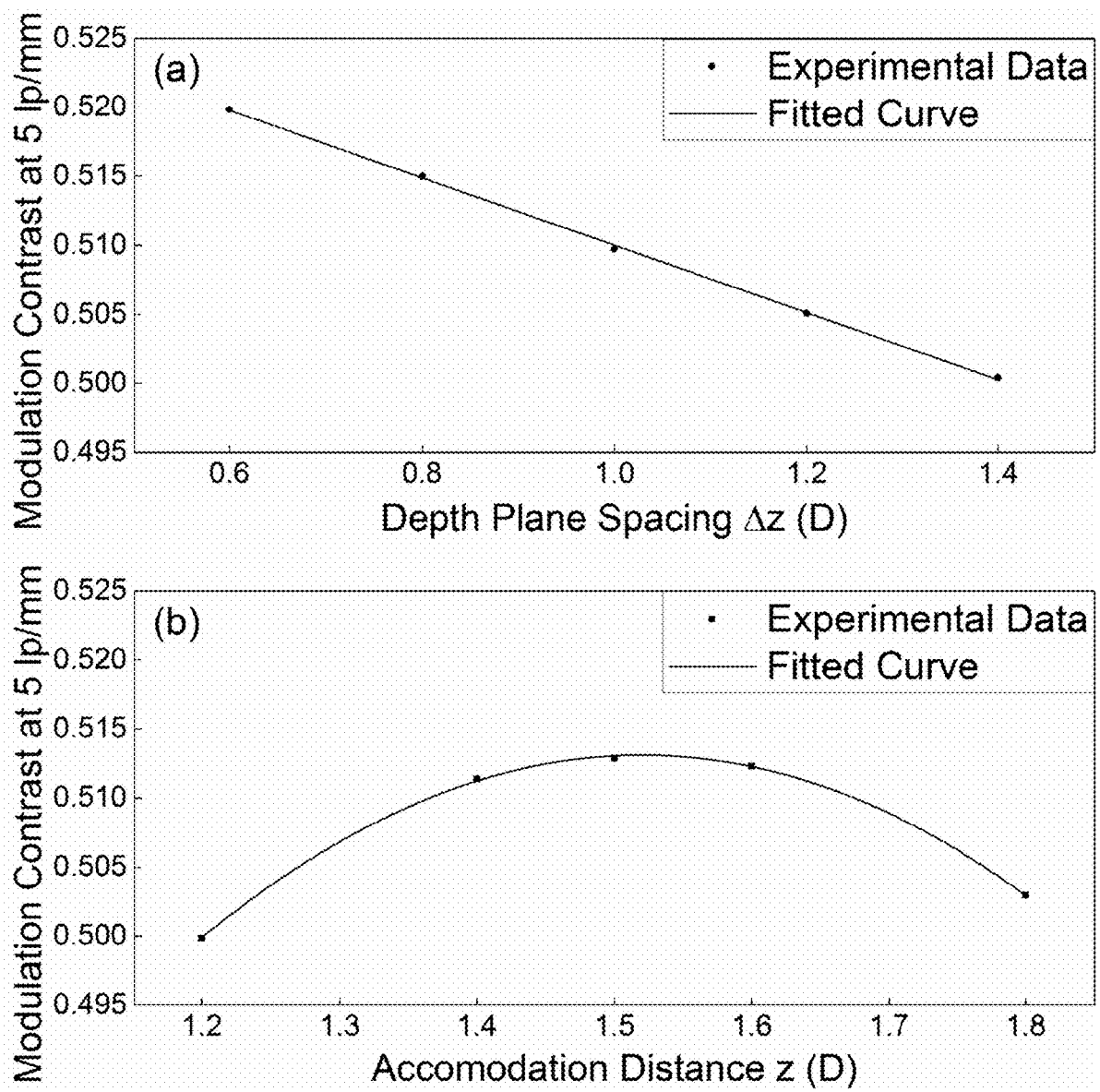
FIG. 4 is a graphical representation of an evaluation of an OMNI display including: (a) Modulation contrast at a given spatial frequency (5 lp/mm) versus depth plane spacing ($\Delta z$); and (b) Modulation contrast at a given spatial frequency (5 lp/mm) versus the accommodation distance (z), where the modulation contrasts were calculated using a standard slanted edge method.

The depth plane spacing and accommodation distance were then varied to evaluate their effects on the image contrast. In this mapping experiment, a camera was positioned in front of the eyepiece to mimic an eye that focused at 1.5D. Two sub-panel images (a slanted edge) were displayed at the OLED and they were projected to (1.5+Δz/2)D and (1.5−Δz/2)D, respectively. The depth plane spacing was varied, Δz, through changing the effective focal length $f_i$ in the phase pattern at the LCOS-SLM (Equation shown above). Accordingly, depth-fused images were acquired at the camera, and the image modulation contrast was calculated. The dependence of modulation contrast on the depth plane spacing Δz is shown in FIG. 4a. The modulation contrast degrades as the depth plane spacing increases. However, for a given number of depth planes, decreasing the depth plane spacing will unfavorably reduce the total depth range. Therefore, one should balance the image quality for a desired depth range.

In another mapping experiment, the focal depth was varied, z, of the camera to mimic the accommodation distance change of the eye. At the input end, two identical images were displayed at the 1D and 2D depth plane. Because the light intensities along a line of sight at these two depth planes are identical, the rendered depth is at the dioptric midpoint, 1.5D. Images were captured at a variety of dioptric accommodation distances and the corresponding image modulation contrasts were derived. The result (FIG. 4b) shows that the modulation contrast reaches the maximum at z=1.5D and degrades smoothly around this depth. Since the human eye inherently focuses on the depth that provides the highest modulation contrast, OMNI display 200 thereby provides a correct focus cue that can drive the eye's accommodation to the desired depth.

Figure 5:
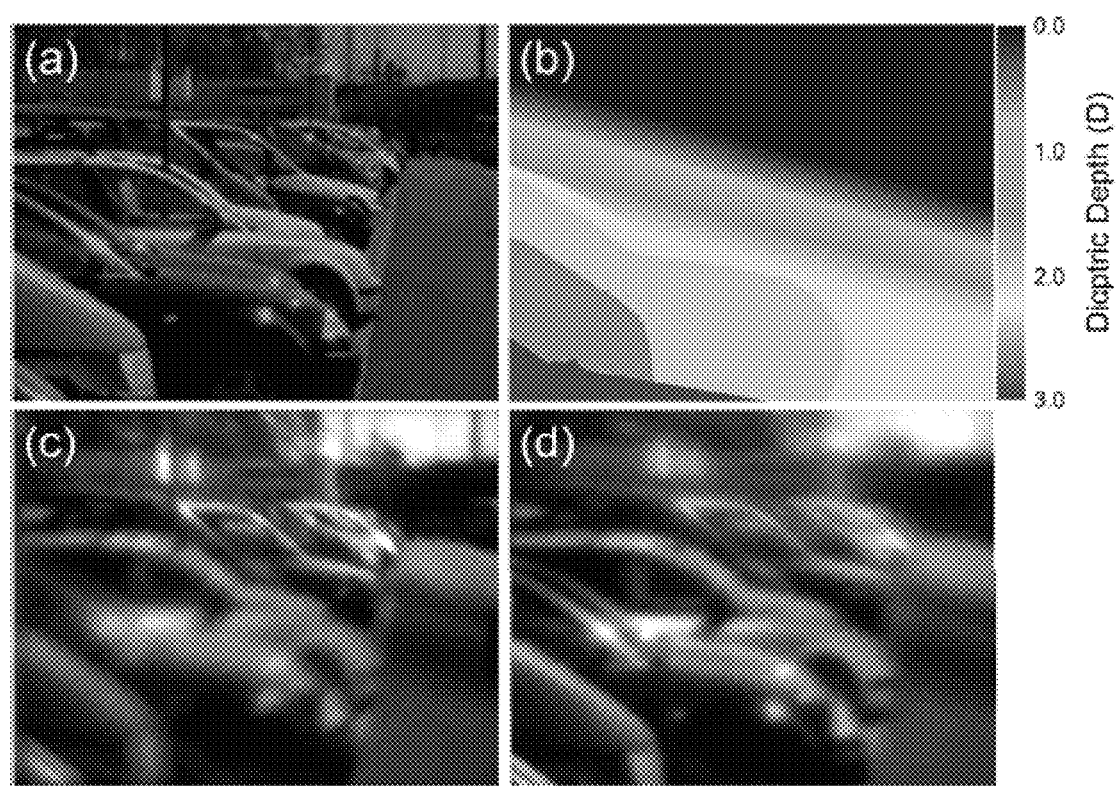
FIG. 5 is an OMNI display of a complex three-dimensional scene including: (a) Ground-truth all-in-focus image; (b) Ground-truth depth map; (c) Representative depth image captured at 0D; and (d) Representative depth image captured at 3D.

The OMNI display 200 was also tested using a complex three-dimensional scene. The ground-truth all-in-focus image and the corresponding depth map are shown in FIGS. 5(a) and (b), respectively. The display contents were generated at four nominal depth planes (0D, 1D, 2D, and 3D). The focal depth of the camera was varied to mimic the accommodation distance change of the eye. The depth-fused images captured at a far plane (0D) and a near plane (3D) are shown in FIGS. 5(c) and (d), respectively, matching closely with the ground-truth depth map (FIG. 5(b)).

In the OMNI display 200, an LCOS-SLM was utilized as the SMU to accomplish the optical mapping. However, the SMU can also be other phase modulation devices, such as a volume holography grating or a distorted phase grating. Similar to the LCOS-SLM, both these phase modulators can act as a multifocal off-axis Fresnel lens, directing the sub-panel images to the designated depths while forcing their centers aligned. However, unlike the LCOS-SLM, the volume holograph grating and distorted phase grating are passive devices. Passive phase modulators require no power supplies, reducing the system volume as well as power consumption. However, because their phase patterns are stationary, passive phase modulators may not scale the display parameters in the adaptive fashion as previously discussed.

The OMNI display 200 can reproduce colors. Using a white light OLED as the input screen, a sub-panel image can be split into three channels, followed by covering them with a red, green, and blue color filter, respectively. Accordingly, at the LCOS-SLM, a phase pattern is displayed that compensates for the wavelength difference, thereby mapping these filtered images to the same depth. Nevertheless, given a desired depth plane spacing, displaying colors will unfavorably reduce the lateral resolution by a factor of three.

The OMNI display 200 provides an optical mapping near-eye three-dimensional display method with correct focus cues that are consistent with the binocular vision, thus eliminating the vergence-accommodation conflict. Through mapping different sub-panel images of a display screen to various axial depths, a high-resolution three-dimensional image is created over a wide depth range. The image dynamic range and refresh rate may be limited by only the display screen itself, such as up to 12 bits and 30 Hz, respectively.

Figure 6A:
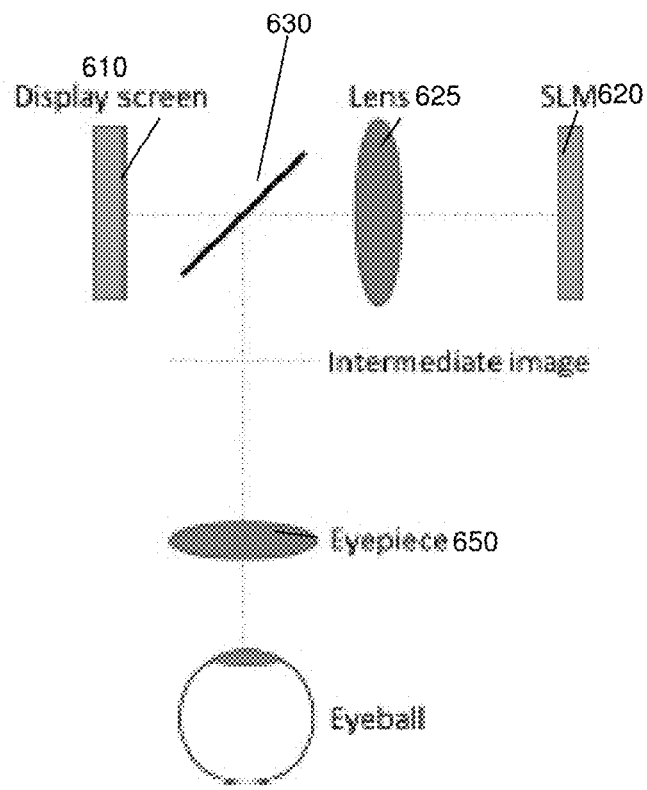
FIG. 6A is a block diagram illustrating an example embodiment of an optical mapping near-eye three dimensional display utilizing a phase-only spatial light modulator for virtual reality in accordance with various aspects described herein.
Figure 6B:
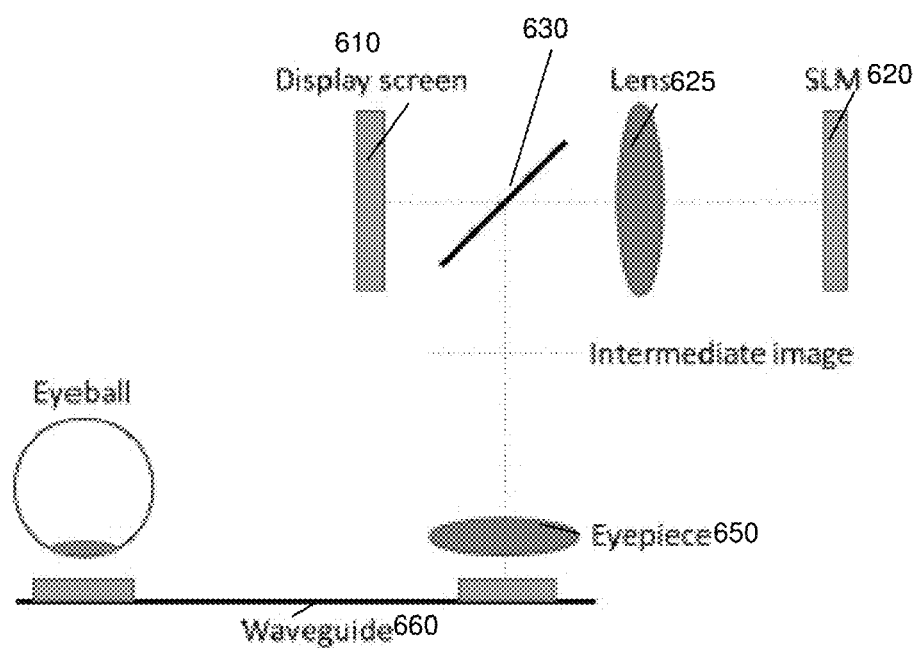
FIG. 6B is a block diagram illustrating an example embodiment of an optical mapping near-eye three dimensional display utilizing a phase-only spatial light modulator for augmented reality in accordance with various aspects described herein.

FIGS. 6a, 6b illustrate an implementation of a phase-only reflective LCOS spatial light modulator for virtual reality (FIG. 6a) and augmented reality displays (FIG. 6b). In FIG. 6a, the light emanated from the display screen 610 passes through the beam splitter 630 where the transmitted light is then collimated by a lens 625. The SLM 620 locates at the Fourier plane of display screen 610, modifying the phase of incident light. The reflected light is then collected by the same lens 625. Half of the light is reflected at the beam splitter 630, forming intermediate sub-images close to the lens' back focal plane. These sub-images are then collimated by an eyepiece 650 and reimaged onto the viewer's retina by the crystalline lens. The optical setup in FIG. 6b is similar to FIG. 6a which is similar to the optical setup in FIG. 2. However in the embodiment of FIG. 6b, after being collimated by the eyepiece 650, the light is directed into a waveguide 660 and transferred to the eye pupil. Since the waveguide 660 is transparent, the light emanated from the real-world objects can also enter the eye pupil, forming an image overlaid with the virtual objects. In one or more embodiments, other view combiner devices can be used in place of the waveguide 660, such as a beam splitter or a prism.

To provide an example, the display of FIG. 6a is described using only off-the-shelf components. The system projects four virtual images onto planes which are 0, 1, 2, and 3 diopters from the viewer. Based on the thin lens equation, the depth spacing, Δu, between adjacent images at the object side of eyepiece is:

$$\Delta u = \frac{\Delta D}{(1/f_e + D)^2}, \tag{1}$$

where ΔD is depth spacing in diopters between adjacent virtual images, D is depth in diopters, and $f_e$ is the focal length of eyepiece. To separate these images along the depth axis, their spacing Δu must be greater than the lens' depth of focus, i.e.

$$\Delta u > \frac{2\lambda}{\pi NA^2}. \tag{2}$$

Here NA is the numerical aperture of the lens. Combining Eq. 1 and Eq. 2 yields $$NA > \sqrt{\frac{2\lambda}{\pi \Delta D}} \frac{1}{f_e}. \tag{3}$$

To mimic an off-axis Fresnel lens with focal length $f_{SLM}$ the SLM displays a phase pattern which can be mathematically described by:

$$\varphi = \frac{\pi r^2}{\lambda f_{SLM}} + \frac{2\pi}{\lambda}(\sin\theta_x x + \sin\theta_y y). \tag{4}$$

At the display screen, sub-images are displayed. The size of each sub-image is $l_1 \times l_2$ mm². To shift the centers of sub-images to the optical axis, the SLM must divert the chief rays towards the directions:

$$\theta_x \sim \frac{l_1}{2f_l}, \theta_y \sim \frac{l_2}{2f_l}. \tag{5}$$

Given small angle approximation, combining Eq. 4 with Eq. 5 gives:

$$\varphi = \frac{\pi r^2}{\lambda f_{SLM}} + \frac{\pi}{\lambda f_l}(l_1 x + l_2 y) \tag{6}$$

The phase gradients along the x and y axes are $$\frac{\Delta\varphi}{\Delta x} = \frac{2\pi x}{\lambda f_{SLM}} + \frac{\pi l_1}{\lambda f_l} \quad (7)$$

$$\frac{\Delta\varphi}{\Delta y} = \frac{2\pi x}{\lambda f_{SLM}} + \frac{\pi l_2}{\lambda f_l}.$$

In practice, the phase change across a pixel must be smaller than $0.5\pi$ (i.e., $2\pi$ phase is sampled by four SLM pixels):

$$\left(\frac{2\pi x}{\lambda f_{SLM}} + \frac{\pi l_1}{\lambda f_l}\right)P < 0.5\pi \quad (8)$$

$$\left(\frac{2\pi x}{\lambda f_{SLM}} + \frac{\pi l_2}{\lambda f_l}\right)P < 0.5\pi,$$

where P is the dimension of the pixel. From Eq. 7, we can get, $$l_1 < f_l\lambda/2P \quad (9)$$

$$l_2 < f_l\lambda/2P$$

$$f_{SLM} > \frac{4x_{max}P}{\lambda}.$$

Reimaged by the eyepiece, the final angular FOV is $$FOV = \sqrt{l_1^2 + l_2^2}/f_e \quad (10)$$

System components are illustrated in Table 2, which were determined based on the design constraints described by Eq. 3, 9, and 10, and the correspondent first-order design parameters are summarized in Table 3:

TABLE 2

System components based on design constrains described by Eq. 3, 9, and 10.

| | |
|---|---|
| Display screen | MICROOLED, MDP02, 2600 × 2088 pixels, pixel pitch, 4.7 um. Sensor size, 12.2 mm × 9.8 mm. |
| Lens | Edmund Optics, 2X EO M Plan Apo Long Working Distance Infinity Corrected, $f_l$ = 100 mm, NA = 0.055, WD = 34 mm, FOV = 12 mm (8.5 mm × 8.5 mm), aperture diameter, 11 mm. |
| SLM | Holoeye, GAEA-VIS-036 Phase Only Spatial Light Modulator (420-650 nm), pixel pitch P = 3.74 μm, frame rate, 25 Hz, phase noise, 0.06 π. |
| Eyepiece | Edmund Optics, $f_e$ = 12 mm Mounted, RKE Precision Eyepiece |

TABLE 3

Correspondent first-order design parameters.

| | |
|---|---|
| Image resolution | $l_1$ = 4.25 mm, $l_2$ = 4.25 mm, 900 × 900 pixels. |
| Angular FOV | ~29 degrees |
| Focal lengths of SLM (m) | 23.981, 36.404, 73.671, and infinity |
| Quadratic phase term at the edge of pupil | 2.2934 π, 1.5108 π, 0.7466 π, 0 (must be greater than 10× phase noise, 0.06 π) |
| Linear phase gradient | 0.29 π/pixel (must be smaller than 0.5 π/pixel) |
| Perception depths for the viewer | 0, 1, 2, 3 diopters |

FIGS. 7a,b illustrate an implementation of the near-eye 3D display using a volume holography grating 720 for virtual reality (FIG. 7a) and augmented reality displays (FIG. 7b). In one embodiment, the electronic screen 710 can be divided into a number of panels (e.g., four), each displaying a sub-image. This implementation utilizes a volume hologram's wavefront selection properties to simultaneously project multiple sub-images to different depths. In FIG. 7a, the volume hologram is placed at the aperture stop of a lens 715, acting as a Bragg filter and allowing photons with only specific propagation angles and wavelengths to pass through. To enable simultaneous projection of multiple planes, the volume hologram can be produced in a multiplexed manner—superimposed by holographic gratings 720 with different frequency patterns. Each multiplexed grating can be Bragg matched to a different depth and diffracts the light to a different central angle. After passing through the volume hologram, the diffracted light is collected by a second lens 725, forming images at different depths close to the back focal plane of the eyepiece 750. Finally, these images are collimated by the eyepiece 750 and reimaged onto the viewer's retina by the crystalline lens.

The optical setup in FIG. 7b is similar to FIG. 7a. However, after being collimated by the eyepiece 750, the light is directed into a waveguide 760 and transferred to the eye pupil. Since the waveguide 760 is transparent, the light emanated from the real-world objects can also enter the eye pupil, forming an image overlaid with the virtual objects. In one or more embodiments, other view combiner devices, such as a beam splitter or a prism, can replace the waveguide 760.

Figure 8A:
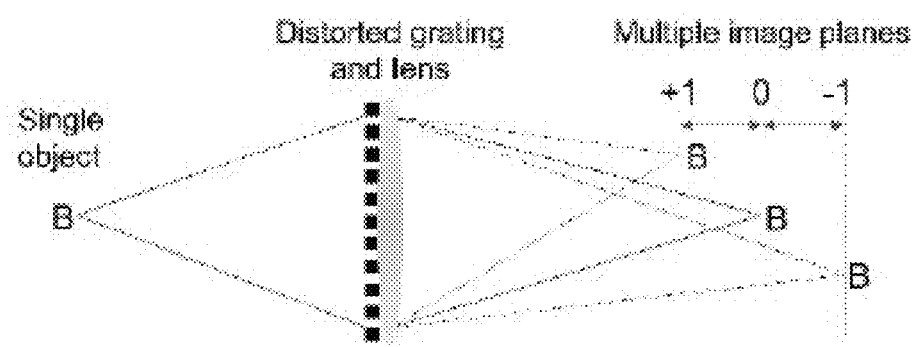
FIGS. 8a, b is a block diagram illustrating an example embodiment of imaging through a distorted phase grating in accordance with various aspects described herein.
Figure 8B:
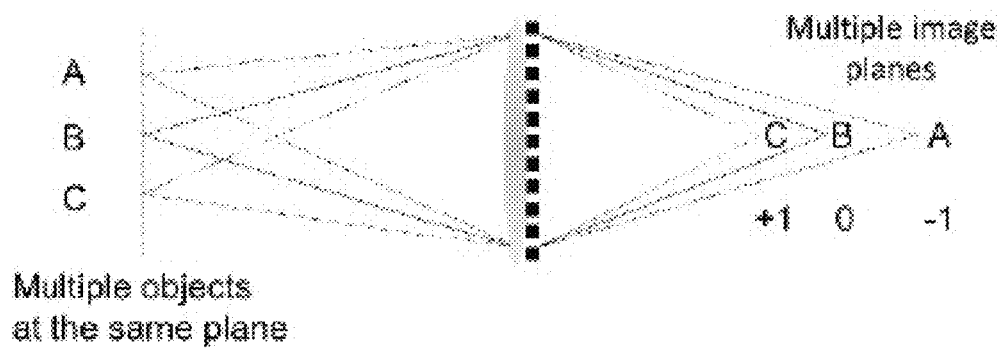

Referring to FIGS. 8a,b, a distorted phase grating can introduce different levels of defocus in the wavefront and diffract them into different orders. Therefore, when a distorted grating is placed close to a lens, it effectively modifies the focal length of the lens in non-zero diffraction orders, playing the role of a defocus compensator. Additionally, the diffraction angles enable depth remapping. The effect of a distorted phase grating on an imaging system is illustrated in FIGS. 8a,b. The combination of a distorted grating and a lens images a single object onto different depth planes in each different diffraction order is shown in FIG. 8a. If multiple objects are located at the same plane but different lateral positions, one or more embodiments can simultaneously image them onto multiple depths while forcing their centers aligned. In FIG. 8b, the three depth images correspond to the objects A, B, C associated with the −1, 0, and +1 diffraction orders, respectively.

Figure 9A:
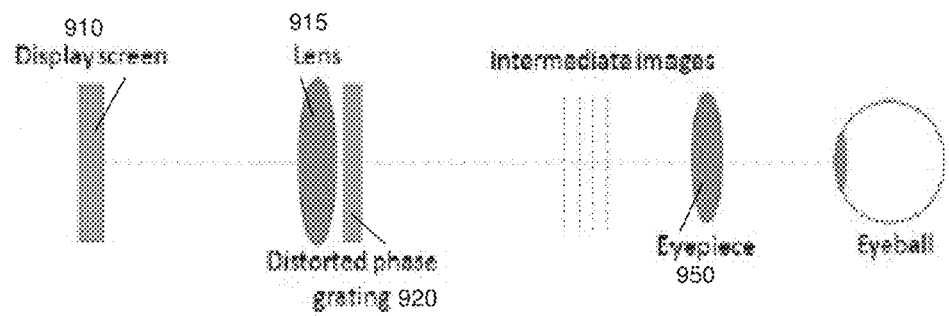
FIG. 9a is a block diagram illustrating an example embodiment of an optical mapping near-eye three dimensional display utilizing a distorted phase grating for virtual reality in accordance with various aspects described herein.
Figure 9B:
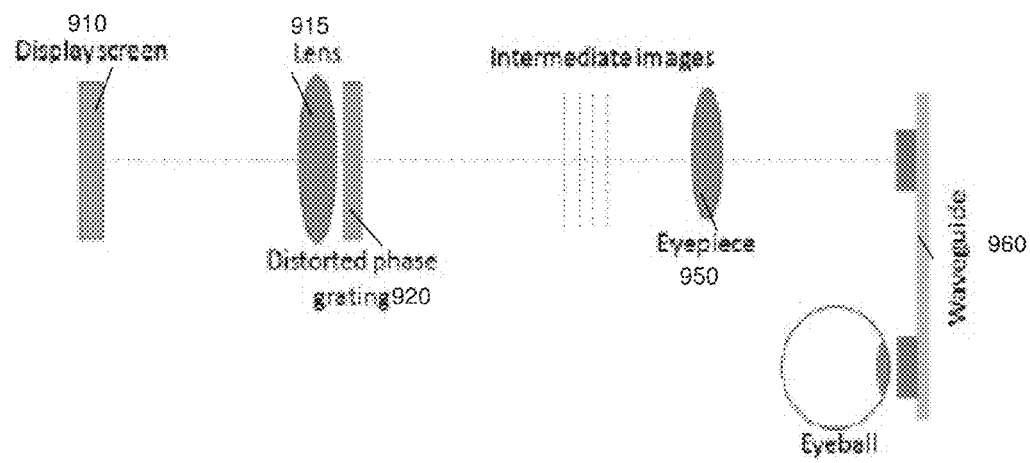
FIG. 9b is a block diagram illustrating an example embodiment of an optical mapping near-eye three dimensional display utilizing a distorted phase grating for augmented reality in accordance with various aspects described herein.

FIGS. 9a, b illustrate an embodiment of a near-eye 3D display using a distorted phase grating 920 for virtual reality (FIG. 9a) and augmented reality displays (FIG. 9b). The electronic screen 910 can be divided into a number of panels (e.g., four), each displaying a sub-image. A distorted phase grating 920 is closely placed next to a lens 915, alternating the effective focal length of the lens for different diffraction orders. After passing through the distorted phase grating 920 and the lens 915, the diffracted light is focused to different depths which are close to the back focal plane of the eyepiece 950. Finally, these images are collimated by the eyepiece 950 and reimaged onto the viewer's retina by the crystalline lens. The optical setup in FIG. 9b is similar to FIG. 9a. However, after being collimated by the eyepiece 950, the light is directed into a waveguide 960 and transferred to the eye pupil. Since the waveguide 960 is transparent, the light emanated from the real-world objects can also enter the eye pupil, forming an image overlaid with the virtual objects. In one or more embodiments, the waveguide

960 can be replaced by other view combiner devices, such as a beam splitter or a prism.

Figure 10A:
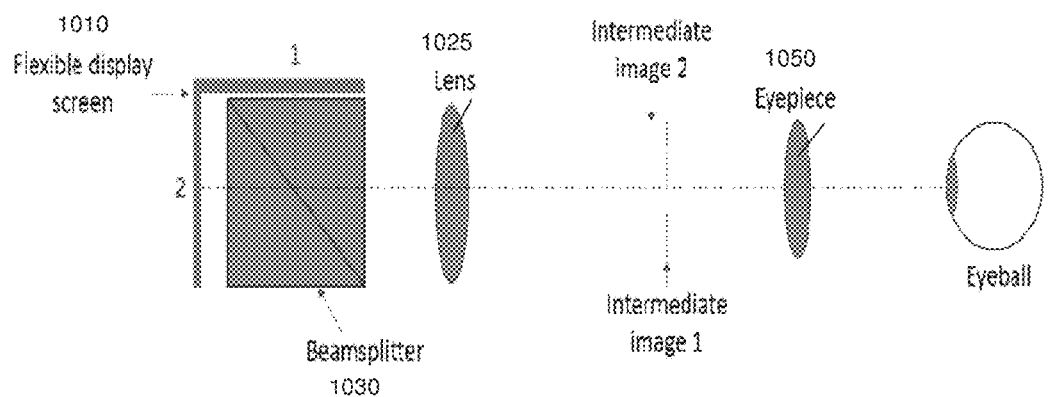
FIG. 10a is a block diagram illustrating an example embodiment of an optical mapping near-eye three dimensional display utilizing a folded flexible display screen for virtual reality in accordance with various aspects described herein.
Figure 10B:
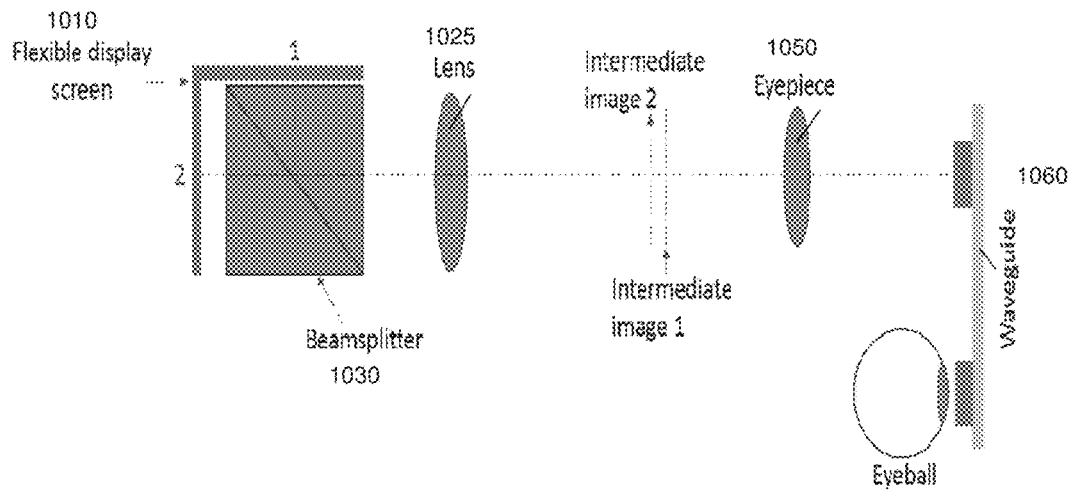
FIG. 10b is a block diagram illustrating an example embodiment of an optical mapping near-eye three dimensional display utilizing a folded flexible display screen for augmented reality in accordance with various aspects described herein.

FIGS. 10*a, b* illustrate an embodiment of a near-eye 3D display using a flexible electronic screen 1010 for virtual reality (FIG. 10*a*) and augmented reality displays (FIG. 10*b*). In One or more embodiments, the flexible electronic screen 1010 (e.g., a flexible OLED) can be folded into a number of panels (e.g., panels 1 and 2), each aligning with a surface of a beam splitter 1030. Each panel displays an image. The light emitting from these two panels is combined by the beam splitter 1030. An optical path difference is introduced between these two imaging arms by laterally sliding the beam splitter 1030 along panel 1 of the display screen 1010, creating a gap between panel 2 and the beam splitter. The displayed panel images are then projected to different depth planes by a lens 1025 and finally onto the viewer's retina by an eyepiece 1050 and the crystalline lens. In another embodiment, two separate electronic screens can be utilized that may or may not be flexible. The optical setup in FIG. 10*b* is similar to FIG. 10*a*. However, after being collimated by the eyepiece 1050, the light is directed into a waveguide 1060 and transferred to the eye pupil. Since the waveguide 1060 is transparent, the light emanated from the real-world objects can also enter the eye pupil, forming an image overlaid with the virtual objects. In FIG. 6*b*, the waveguide 1060 can be replaced by other view combiner devices, such as a beam splitter or a prism.

In one or more embodiments, a 3D near eye display device can include a computer running software to execute algorithms to modulate wavefronts and assist in remapping images. In one or more embodiments, a 3D near eye display device can include a SMU modulating the phase and/or amplitude of incident light. In one or more embodiments, a 3D near eye display device can include a second focusing element capable of mapping different portions of the display screen to different depths while forcing their centers to align. In one or more embodiments, a 3D near eye display device can include a third focusing element located between a second focusing element and an eyepiece, where the third focusing element focuses a remapped image into the eyepiece. In one or more embodiments, a 3D near eye display device can be wearable. In one or more embodiments, a 3D near eye display device can be in the shape of a helmet, goggles or glasses. In one or more embodiments, a 3D near eye display device can be used for virtual reality or augmented reality. In one or more embodiments, a 3D near eye display device can include a display screen displaying at least 2 sub-images, each sub-image displayed at different depths. In one or more embodiments, a 3D near eye display device can include a SMU modifying the phase of incident light and adding quadratic and linear phase terms to the incident wave front. In one or more embodiments, a 3D near eye display device can display different portions of a display screen to different depths while forcing their centers aligned. In one or more embodiments, a 3D near eye display device can form 3D images with a high dynamic range limited by only the display screen itself. In one or more embodiments, a 3D near eye display device can be configured where the display screen is provided by a secondary device. In one or more embodiments, the secondary device is a cell phone or a tablet.

In one or more embodiments, a 3D near eye display device can include a flexible display screen for displaying a 2D image, a beam splitter, a SMU, a focusing element, and an eye piece. In one or more embodiments, the beam splitter can be located in close proximity to a flexible display screen folded into a 90 degree angle and displaying at least one image on each side the folded screen, where the focusing element is located between the eyepiece and the flexible display screen. In one or more embodiments, the flexible display screen can be a flexible OLED.

In one or more embodiments, a near-eye 3D augmented reality display can include a display screen capable of displaying more than one 2D image of varying depth, a first focusing element capable of collimating the images from the display screen to form a plurality of sub-images, a SMU capable of remapping the plurality of sub-images to different depths forcing their centers to align to form remapped sub-images, a second focusing element capable of focusing the remapped sub-images, an eye piece, and a view combiner. In one or more embodiments, the view combiner optically combines the computer simulated 3D image with real-world objects.

In one or more embodiments, a method of 3D near-eye display can include remapping different portions of a display screen comprising multiple images to different depths to create a plurality of sub-images, where the centers of the plurality of sub-images are aligned, and reimaging the plurality of sub-images into an eyepiece.

One or more of the exemplary embodiments described herein provide an OMNI three-dimensional display method which provides correct focus cues for depth perception. One or more of the exemplary methods map different portions of a display screen to various depths while forcing their centers aligned. These intermediate depth images can then be reimaged by an eyepiece and projected onto the viewer's retina.

One or more embodiments can include a machine in the form of a computer system within which a set of instructions, when executed, may cause the machine to perform any one or more of the methods described above. In some embodiments, the machine may be connected (e.g., using a network) to other machines.

The computer system may include a processor (or controller) (e.g., a central processing unit (CPU)), a graphics processing unit (GPU, or both), a main memory and a static memory, which communicate with each other via a bus. The computer system may include an input device (e.g., a keyboard), a cursor control device (e.g., a mouse), a disk drive unit, a signal generation device (e.g., a speaker or remote control) and a network interface device. The disk drive unit may include a tangible computer-readable storage medium on which is stored one or more sets of instructions (e.g., software) embodying any one or more of the methods or functions described herein, including those methods illustrated above. The instructions may also reside, completely or at least partially, within the main memory, the static memory, and/or within the processor during execution thereof by the computer system. The main memory and the processor also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

What is claimed is:

1. A display device comprising:
a focusing element that collimates a plurality of two dimensional images that are displayed on a display screen; and
a spatial multiplexing unit that remaps the plurality of two dimensional images to different depths while forcing centers of the plurality of two dimensional images to align.

2. The display device of claim 1, wherein the spatial multiplexing unit comprises one of a liquid-crystal-on-silicon spatial light modulator, a volume holography grating, and a distorted phase grating.

3. The display device of claim 1, further comprising a beam splitter positioned between the display screen and the focusing element.

4. The display device of claim 1, wherein the focusing element is located between the display screen and the spatial multiplexing unit.

5. The display device of claim 1, further comprising a view combiner device that provides augmented reality viewing.

6. The display device of claim 1, wherein the plurality of two dimensional images comprises a first sub-panel image, a second sub-panel image, a third sub-panel image and a fourth sub-panel image, and wherein each of the first sub-panel image, the second sub-panel image, the third sub-panel image and the fourth sub-panel image is displayed adjacent one another on a single panel of the display screen.

7. The display device of claim 6, further comprising a second lens, wherein the focusing element comprises a first lens, wherein the first lens is positioned between the display screen and the spatial multiplexing unit, and wherein the second lens is positioned between the spatial multiplexing unit and an eye piece.

8. A method comprising:
collimating, by a focusing element, a plurality of two dimensional images that are displayed on a display screen; and
modifying, by a spatial multiplexing unit, a phase of light transmitted from the focusing element by adding one or more quadratic phase terms and one or more linear phase terms to a wave front of the light, wherein the modifying results in multiplane images.

9. The method of claim 8, wherein the plurality of two dimensional images comprises a first sub-panel image, a second sub-panel image, a third sub-panel image and a fourth sub-panel image, and wherein each of the first sub-panel image, the second sub-panel image, the third sub-panel image and the fourth sub-panel image is displayed adjacent one another on a single panel of the display screen.

10. The method of claim 8, wherein the display screen is part of a wearable device, wherein the focusing element is part of the wearable device, wherein the spatial multiplexing unit is part of the wearable device, wherein the method further comprises reimaging, by an eye piece of the wearable device, the multiplane images onto a viewer's retina, wherein the one or more quadratic phase terms axially shifts a plurality of sub-panel images of the multiplane images to designated depths, and wherein the one or more linear phase terms laterally shifts centers of the sub-panel images of the multiplane images to an optical axis.

11. The method of claim 10, further comprising reflecting, by a beam splitter of the wearable device, light of the multiplane images towards the eye piece of the wearable device.

12. The method of claim 10, further comprising overlaying, by a view combiner device of the wearable device, an image of a real world object with the multiplane images.

13. The method of claim 10, further comprising applying, to the plurality of two dimensional images, one or more of color filtering and polarization, wherein the color filtering is applied by a color filter of the wearable device, and wherein the polarization is applied by a linear polarizer of the wearable device.

14. A display device comprising:
a beam splitter having a first surface and a second surface, wherein the first surface aligns with a first panel that displays a first two dimensional image, wherein the second surface aligns with a second panel that displays a second two dimensional image, and wherein the beam splitter combines first light emanating from the first panel and second light emanating from the second panel, resulting in combined light;
an actuator configured to slide the beam splitter in a direction along the first panel to adjust a gap between the second panel and the second surface of the beam splitter; and
a focusing element that projects each of a plurality of images in the combined light to a respective distinct one of a plurality of different depth planes.

15. The display device of claim 14, wherein the first panel and the second panel are part of a single flexible display screen that is foldable to form the first panel and the second panel.

16. The display device of claim 14, wherein the focusing element comprises a lens that is positioned between the beam splitter and an eye piece.

17. The display device of claim 14, further comprising a view combiner device that provides augmented reality viewing.

18. The display device of claim 17, wherein the view combiner device is selected from a waveguide, another beam splitter, and a prism.

19. The display device of claim 14, wherein the first panel and the second panel are orthogonal to each other.

20. The display device of claim 14, wherein the first panel and the second panel are part of a flexible organic light emitting diode (OLED), wherein the first two dimensional image comprises a first plurality of images, and wherein the second two dimensional image comprises a second plurality of images.

* * * * *